United States Patent [19]

Fritzsche

[11] 4,048,497
[45] Sept. 13, 1977

[54] METHOD OF MEASURING THE OIL CONSUMPTION OF INTERNAL COMBUSTION ENGINES

[75] Inventor: Gerhard Fritzsche, Neuthard, Germany

[73] Assignee: Gesellschaft fur Kernforschung m.b.H., Karlsruhe, Germany

[21] Appl. No.: 675,593

[22] Filed: Apr. 9, 1976

[30] Foreign Application Priority Data

Apr. 11, 1975 Germany .............................. 2515960

[51] Int. Cl.² ............................................. G01T 1/161
[52] U.S. Cl. .................................................. 250/303
[58] Field of Search ......................................... 250/303

[56] References Cited
U.S. PATENT DOCUMENTS

| 2,957,986 | 10/1960 | Quigg | 250/303 |
| 3,108,184 | 10/1963 | Hull | 250/303 |
| 3,226,197 | 12/1965 | Lewis | 250/303 |
| 3,471,696 | 10/1969 | Mayer et al. | 250/303 |

Primary Examiner—Harold A. Dixon
Attorney, Agent, or Firm—Spencer & Kaye

[57] ABSTRACT

A method is provided for measuring the oil consumption of an internal combustion engine equipped with an exhaust gas line. The oil is radioactively labeled with a radioactive tracer. The exhaust gas is examined for the contents of the tracer with at least one first sample taken from the exhaust gas stream. The exhaust gas stream has oil added to it corresponding to the oil in the internal combustion engine. Subsequently, at least one second sample is taken from the exhaust gas stream downstream of the point of addition and a comparison is made between the contents of radiotracers of the first and second samples. A device for practicing the method is provided.

12 Claims, 2 Drawing Figures

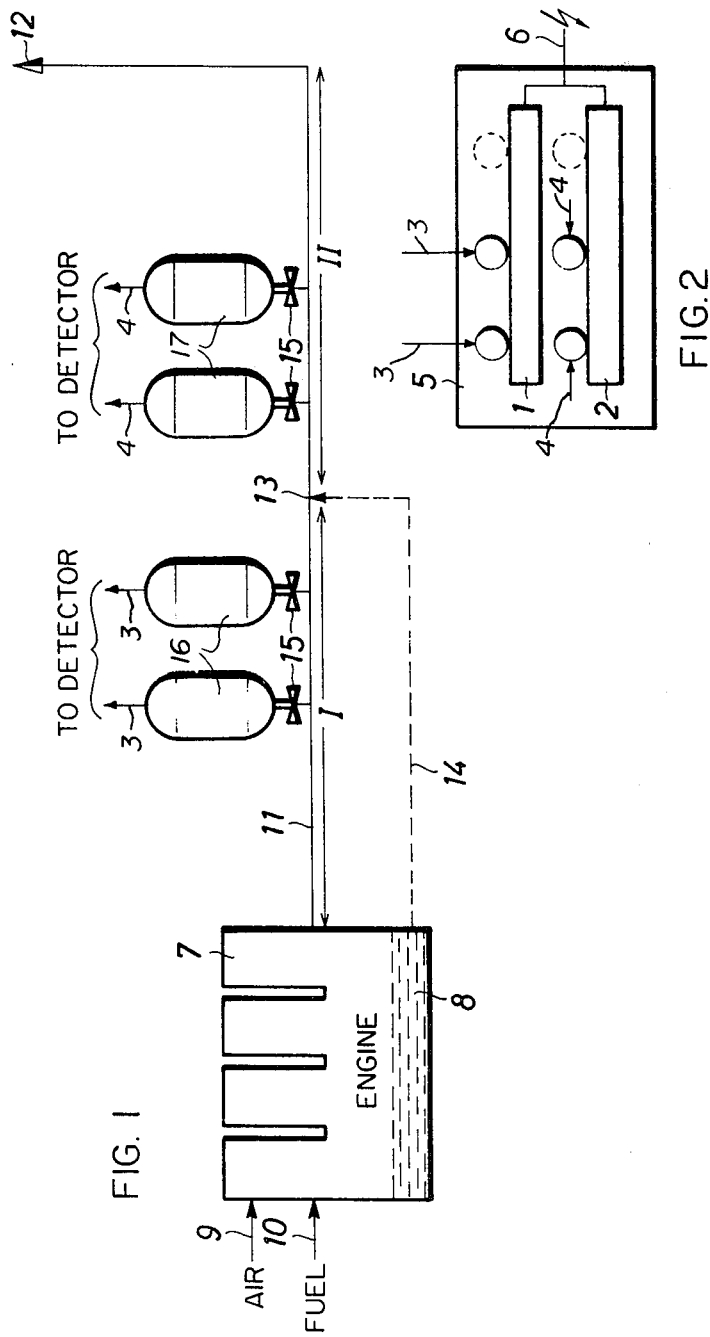

METHOD OF MEASURING THE OIL CONSUMPTION OF INTERNAL COMBUSTION ENGINES

BACKGROUND OF THE INVENTION

The present invention relates to a method and a device for implementing the method of measuring the oil consumption of internal combustion engines in which the oil is radioactively labeled with tritium or other tracers and the exhaust gas is examined for the contents of such tracers.

Methods of measurement are known for assessments of the oil consumption (MTZ 32 (1971) 3, pages 84 to 90) which make use of the measurement of the oil volume or the oil weight for this purpose. Moreover, the determination of the oil consumption by means of labeling with $^3H$ as a tracer and measurement of the $^3H$-consumption in the gas phase is known (Automobiltechnische Zeitschrift 73, No. 3. March 1971, pages 75 – 79). Since the former method of measurement is inaccurate and the results are falsified because of fuel dilution and oil foaming, and since the influence of volatility upon the oil consumption cannot be properly assessed when labeling the oil with Zn and Na tracers, the latter method of measurement must presently be regarded as the most favorable one for measuring oil consumption.

It uses labeling by tritium of the oil and measurement in the gas phase in a proportional counter, where a branch stream is continuously diverted from the exhaust gas of the engine and fed to the proportional counter together with a methane stream. The sump of the engine contains tritiated motor oil. Together with the oil consumption stream the activity stream reaches the exhaust gas and is carried along with it. An activity concentration will build up in the exhaust gas which can be measured in the detector.

However, in order to be able to measure the oil consumption one must determine the detector response probability, the specific activity of the oil to be measured and the volume flow of the exhaust gas; in addition, the following readings must be taken to determine the volume flow of the exhaust gas: volume flow of the intake air, intake pressure, air temperature, fuel density, fuel consumption stream, fuel temperature, exhaust gas temperature and exhaust gas density. Moreover, the detector response probability is not constant for all modes of operation of the engine. It varies on the order of more than 100%. This is due, among other factors, to the different ionization capabilities caused by the composition of the exhaust gas, etc. Hence, for one engine run the response probability must be determined for all operating points of interest with a nontritiated motor oil and a defined addition of $^3H$. Afterwards, the same program must be run again with tritiated oil to measure the oil consumption.

The finite volume of the feed lines to the detector gives rise to a dead time of aproximately two minutes. As a result of the delay in mixing of the gases in the detector, the steady state value, which corresponds to the changed operating point, will appear only some 10 – 12 minutes after a change. Over this period of time the environment will necessarily be contaminated with tritium, which also applies to the measuring period proper, because for the time of the measurement the engine must be running and only a very small branch stream can be used for measurement. Also the trial run of the engine (capital investment and operating cost) is prolonged. High voltage fluctuations in the detector give rise to errors in measurement.

SUMMARY OF THE INVENTION

Now, therefore, it is the purpose of the present invention to offer a method and a device for the implementation of this method which allows a measurement of the oil consumption with shorter engine test periods, independence of the operating point of the engine and with a smaller error due to high voltage fluctuations of the detectors, without requiring measurements of the intake data, and offering flexibility in mixing of the measurement oil and in terms of the measuring period without giving rise to higher environmental contamination with tritium. This measure makes the final result, oil consumption, considerably more accurate.

According to the present invention, this objective is solved by taking at least a first sample of the exhaust gas stream, adding to the exhaust gas stream oil which corresponds to the oil in the internal combustion engine, taking at least one other sample of the exhaust gas stream downstream of the point of addition and by comparing the radiotracer contents of the first and the second samples or averages of these samples.

In an advanced embodiment of the method according to the present invention, the first and the second samples are measured in the first and second detectors, the first and second detectors being operated in parallel.

A first device for the implementation of the method according to the present invention with an engine with a fuel and an air supply line, a sump for radioactively labeled oil, and an exhaust gas line is characterized by a point of addition in the exhaust gas line for fresh radioactive oil or radioactively labeled oil coming from the sump, by one or more sampling points for the first samples upstream of the point of addition, as seen in the direction of the exhaust gas flow, and by one or more other sampling points for second samples to be taken downstream of the point of addition.

Another possible device for the implementation of the method according to the present invention with an engine with an air and a fuel supply line, a sump for radioactively labeled oil, and an exhaust gas line is characterized by a point of addition in the exhaust gas line for fresh radioactive oil or radioactively labeled oil coming from the sump, by one or more sampling points for the first samples to be taken downstream of the point of addition, as seen in the direction of the exhaust gas flow, and by one or more other sampling points for the second to be taken downstream of the first sampling point for the first samples.

BRIEF DESCRIPTION OF THE DRAWING

FIG. 1 is a schematic drawing which illustrates one embodiment of a device for practicing the method in accordance with the teachings of the present invention.

FIG. 2 is a schematic drawing which illustrates an arrangement for detectors which are used in the practice of the present invention.

DESCRIPTION OF THE PREFERRED EMBODIMENTS

The present invention will be explained in more detail below on the basis of an embodiment by means of a schematic representation of the first device implementing the method.

The manufacture of the tritiated oil is based on approximately 20 high level oil fractions labeled with $^3H$.

Depending on the boiling point curve of the oil to be used, the activity can now be mixed in such a way that there are no differences in the specific activities of individual fractions of the completely mixed oil. In this way, the influence of volatility on the oil consumption can be properly assessed. Any kind of oil can be labeled without major expense (extra tritiation). This allows also other parameters of the oil to be examined, such as the viscosity and volatility.

The measurement is carried out by exhaust gas sampling. The detectors 1 and 2 (FIG. 2) of a known design for the first and second samples 3 and 4 are purged with methane and discharged to 0.75 atm of methane. On top of this methane gas the exhaust gas samples 3 and 4, respectively, are added to the detectors 1 and 2 until 1 atm has been restored. Both detectors 1 and 2 are jointly located in an air conditioned room 5 and, in order to prevent errors due to fluctuations of the high voltage, are connected to a joint high voltage source 6, as shown in FIG. 2.

FIG. 1 is a schematic diagram of the first device. The engine 7 has a sump 8 containing the radioactively labeled oil. Air and fuel, respectively, are fed to the engine 7 through lines 9 and 10, respectively. Moreover, exhaust gas line 11 is connected to the engine. Exhaust gas line 11 is subdivided into two sections I and II and leads to a stack 12. The subdivision of the exhaust gas line 11 is caused by the point of addition 13.

To measure the engine operating point, the first and the second exhaust gas samples 3 and 4 are each taken in pairs. This is done after the engine 7 has reached its constant operating point. By means of an injection pump (not shown in detail) at the point of addition 13 it is possible to inject into the exhaust gas stream in the exhaust gas line 11 a constant oil stream with activated oil from the sump 8 through line 14 or oil corresponding to the oil contained in the sump 8. It is ensured that this additional oil is burnt and the activity is present in the gas phase.

The injection can be made following the first sampling in line section I. Section I of the exhaust gas line 11 only carries the activity coming from the oil consumption in the engine 7, whereas section II downstream of the addition device 13 in addition contains the known activity continuously added. The first samples 3 (one or more of these are possible) are taken upstream of the point of addition 13, as seen in the direction of the exhaust gas flow. However, this sampling may be made also downstream of the point of addition 13, just as the sampling of samples 4 (again, one or more second samples can be taken) but in advance of taking samples 4. At the same time, care must be taken to ensure that in this case the injection at the point of addition 13 is made only after the first samples 3 have been taken.

Samples 3 and 4 may be taken e.g., by evacuated steel cylinders 16 and 17, respectively, whose solenoid valves 15 are opened for the measurement. Samples can also be taken by means of membrane pumps.

The first and second samples 3 and 4 each are measured in pairs in the two detectors 1 and 2 at the same time. As has been mentioned above, both detectors 1 and 2 are supplied the same high voltage 6. In this way it is impossible for fluctuations to give rise to the errors otherwise known.

The oil consumption resulting from the measurement turns out to be $$\dot{V} = (I_V/I_{V+} - I_V) \dot{Z}$$

where $\dot{V}$ is the oil consumption in ml/h, $I_V$ is the pulse rate of sample 3, $I_{V+}$ the pulse rate of sample 4, $\dot{Z}$ the amount injected in ml/h.

This intercomparison measurement avoids errors caused by different detector response probabilities. Since the amount added, $\dot{Z}$, can be determined very accurately by the injection pump at the point of addition 13 and, e.g., the speed of this injection pump can be determined very accurately and the only parameters of the measurement are two count rates and pulse rates, respectively, $I_V$ and $I_{V+}$, the error appearing in measuring the oil consumption $\dot{V}$ will be determined essentially only by the statistics of radioactive decay. Since the method does not operate in the on-line mode, this error can be diminished by longer measuring times.

I claim:

1. A method for measuring the oil consumption of an internal combustion engine equipped with an exhaust gas line which carries an exhaust gas stream, comprising:
   a. labelling the oil with a radioactive tracer;
   b. taking at least one first sample from the exhaust gas stream at a location which only carries activity coming from the oil consumption in the engine;
   c. adding to the exhaust gas stream radioactively labelled oil corresponding to the oil in the internal combustion engine;
   d. subsequently taking at least one second sample from the exhaust gas stream downstream of the point of addition of the oil, and
   e. comparing the amounts of radioactive tracer present in the first and second samples.

2. Method as defined in claim 1 wherein the radioactively labelled oil added in step (c) is radioactively labelled oil coming from the sump.

3. Method as defined in claim 1 wherein the radioactively labelled oil added in step (c) is fresh radioactively labelled oil.

4. Method as claimed in claim 1 wherein the first and the second samples are measured in first and second detectors which are operated in parallel.

5. Method as claimed in claim 1 wherein the radioactive tracer comprises tritium.

6. Method as defined in claim 1 wherein the first sample is taken at a point upstream of the point of addition of the oil.

7. Method as defined in claim 1 wherein the first sample is taken at a point downstream of the point of addition of the oil to the exhaust gas stream but before the oil is added to the exhaust gas stream.

8. The method as defined in claim 1 wherein a plurality of first samples are taken, a plurality of second samples are taken, and the average of the first samples is compared to the average of the second samples.

9. Device for measuring the oil consumption of an internal combustion engine using oil labelled with a radioactive tracer, and equipped with an air supply line, a fuel supply line, an exhaust gas line, and a sump for the radioactively labelled oil, comprising:
   a. oil addition means located in the exhaust gas line to divide the exhaust gas line into an upstream section and a downstream section;
   b. at least one upstream sampling means located in the exhaust gas line in said upstream section; and
   c. at least one downstream sampling means located in the exhaust gas line in said downstream section.

10. The device of claim 9 including an oil line connecting the sump with said oil addition means.

11. Device for measuring the oil consumption of an internal combustion engine using oil labelled with a radioactive tracer, said engine being equipped with an air supply line, a fuel supply line, a sump for the radioactively labelled oil, and an exhaust gas line, comprising:

a. oil addition means connected to the exhaust gas line for adding radioactively labelled oil to the exhaust gas line;

b. at least one first sampling means in the exhaust gas line for taking first samples downstream of the oil addition means; and c. at least one second sampling means in the exhaust gas line for taking second samples downstream of the first sampling means.

12. The device of claim 11 including an oil line connecting the sump with said oil addition means.

* * * * *